United States Patent [19]

Itani

[11] 4,143,724
[45] Mar. 13, 1979

[54] ELECTRONIC WEIGHING APPARATUS

[75] Inventor: Seiichi Itani, Sakai, Japan

[73] Assignee: Kubota Ltd., Osaka, Japan

[21] Appl. No.: 761,418

[22] Filed: Jan. 21, 1977

[30] Foreign Application Priority Data

Jan. 24, 1976 [JP] Japan .................................. 51-6947

[51] Int. Cl.² .......................................... G01G 19/413
[52] U.S. Cl. ................................ 177/25; 177/DIG. 3; 340/347 AD; 364/567; 364/745
[58] Field of Search ........................ 177/25, 1, DIG. 3; 364/466, 567, 745, 746, 719; 340/347 AD

[56] References Cited

U.S. PATENT DOCUMENTS

| | | | |
|---|---|---|---|
| 3,653,015 | 3/1972 | Rock | 177/25 X |
| 3,879,724 | 4/1975 | McDonald | 340/347 AD |
| 3,891,837 | 6/1975 | Sunstein | 364/745 |
| 4,049,068 | 9/1977 | Kavanagh | 177/25 |

Primary Examiner—Joseph W. Hartary
Attorney, Agent, or Firm—W. G. Fasse; W. W. Roberts

[57] ABSTRACT

An electronic weighing apparatus, is provided with a load cell which is responsive to the weight of an article being weighed. A preamplifier amplifies the analog output signal from the load cell which is representative of the weight of the article, by a predetermined amplification factor. An analog-to-digital converter converts the amplified weight representing analog output signal into a digital signal representative of the weight. The analog-to-digital converter has an enhanced resolution which may be as high as five times the resolution of a conventional A/D converter. An adder adds a first predetermined digital signal representative of the decimal value "2" to the weight representing digital signal. A divider divides the sum output from the adder by a second predetermined digital signal representative of the decimal value "5". A display device displays the quotient output from the divider, whereby the weight representing digital signal from the analog-to-digital converter is first shifted by the digital value "2", whereupon the shifted digital signal is divided by the digital value "5", with the result that an ultimate digital display output is obtained, wherein the zero point of the analog signal is positioned substantially in the center of the analog input range for the digital value "0" in the characteristic curve of the analog input versus digital output transfer function, whereby a differential non-linearity error is minimized.

20 Claims, 7 Drawing Figures

ELECTRONIC WEIGHING APPARATUS

BACKGROUND OF THE INVENTION

1. Field of the Invention

The present invention relates to an electronic weighing apparatus. More specifically, the present invention relates to an improved electronic weighing apparatus wherein an analog voltage signal obtainable from a load transducer, such as strain gauge type load cell, or from a differential transformer or the like, is converted into a digital signal representing the weight of an article being weighted.

2. Description of the Prior Art

In general, a conventional electronic weighing apparatus comprises a load detector for providing an output voltage proportional to the weight of an article being weighted. The detector may be a load cell and a preamplifier is used for amplifying the output voltage from the load cell by a predetermined amplification factor, an analog-to-digital converter is used for converting the analog output voltage from the preamplifier into a digital signal, and a digital display indicates the digital signal from the analog-to-digital converter in a digital manner. Another type of weighing apparatus is also known, wherein a mechanical displacement is caused in proportion to the weight of an article being weighed, a pulse output is generated by a pulse generator responsive to the mechanical displacement, and the number of pulse ouput pulses is counted, to provide a digital signal associated with the weight of the article. However, such a weighing apparatus comprising a mechanical displacement means, a pulse generator and a pulse counter is subject to mechanical wear and external noise disturbance, which could cause an error and malfunction. By contrast, an electronic weighting apparatus employing a load cell and an analog-to-digital converter is free from such shortcomings. Nevertheless, an electronic weighing apparatus employing a load cell and an analog-to-digital converter suffers from other inherent problems to be discussed below.

FIG. 1 is a graph showing an ideal analog input versus digital output transfer function characteristic curve of an electronic weighing apparatus. The stepwise function shows the relation of the digital output Di on the ordinate and the analog input Wi along the abscissa. A straight line a running from the zero point toward a full scale point shows an ideal line of an infinite resolution analog-to-digital converter. Ideally, it is desired that the straight line "a" crosses the step or stage portions of the stepwise curve at the center of the respective step or stage portions. Nevertheless, with a conventional electronic weighing apparatus, it is extremely difficult or rather impossible to position the ideal straight line "a" with respect to the stepwise characteristic curve in such an ideal manner as described above. Thus, in general, it is usual that an error is caused between the actual analog input value Wi and the digital output value Di. Such an error is often referred to as a differential non-linearity error.

More specifically an analog-to-digital converter has regular stepwise transfer function with respect to the analog voltage input Wi and the digital value output Di. One digital value represented by a single step or stage in the curve corresponds to a predetermined range of the analog value. Most ideally, the amount of diversion by the stepwise curve from the ideal straight line "a" in the upward direction and the amount of diversion by the stepwise curve from the straight line "a" in the downward direction should be the same. In other words, the analog input value representative of the weight having the digital value output Di preferably satisfies the following equation whereby the analog input value Wi corresponds to the intersecting point of the ideal straight line "a" and the digital numerical value output Di;

$$Wi = \pm \tfrac{1}{2} LSB$$

where LSB is an abbreviation of the least significant bit and denotes an error indicating unit for the analog-to-digital conversion, which is defined as a variation amount of the analog input necessary for the variation of one digital numerical value output. For example, assuming that the analog load input of 0 to 999 tons is converted into a digital numerical value of 0 to 999, one LSB is one ton.

However, the FIG. 1 graph shows merely an ideal analog input versus digital output characteristic. In general, most analog-to-digital converters now commercially available and employed in electronic weighing apparatuses have not been rated relative to such an ideal characteristic as shown in FIG. 1. The reason is that the analog-to-digital converters now commercially available have a inherent accuracy which is subject to an error affected by the external conditions, such as the ambient temperature and the like. Usually, even the best analog-to-digital converters comprises an error of ± one LSB, as shown in FIG. 2, which shows a possible diversion of the stepwise analog input versus the digital output characteristic curve, from the ideal straight line "a". For instance, the vicinity of the zero point is considered as an important example in the solid line characteristic curve "b", if and when the analog value falls in the range of zero to plus one, the corresponding digital value of zero is obtained, whereas if and when the analog value falls in the range of zero to minus one, the digital value is minus one. Accordingly, if the analog value moves a little from zero in the plus direction, the digital value is zero, whereas if the analog value moves a little from zero in the minus direction, the digital value suddenly becomes minus one. Thus, it is clear that the analog value is converted into an inaccurate digital value, in case of the solid line characteristic curve.

In actuality, the direct opposite situation as shown by the dotted line b' in FIG. 2 could occur by way of another extremity of diversion of the characteristic curve. In other words, diversion of the stepwise analog input versus digital output characteristc with respect to the ideal straight line "a" could occur depending on the mechanical and electrical inherent characteristic of the various components in the electronic weighing apparatus. The solid line stepwise characteristic curve "b" shown in FIG. 2 can be considered as if the fraction in the least significant digit value or the value of the digit that is less significant than the decimal point of the digital output has been processed to be discarded. On the other hand, the dotted line stepwise characteristic curve b' can be considered as if the fraction in the least significant digit value or the value of the digit that is less significant than the decimal point has been processed to be carried over to a more significant digit position. Most idealy, every electronic weighing apparatus should be able to process the fraction in the least significant digit value or the vaue of the digit that is less significant than the decimal point of the digital output such that the value smaller than 0.5 in the least significant digit of the digital output is discarded while the value exceeding 0.5 in the least significant digit of the digital output is carried over to the more significant digit. Nevertheless, in a conventional electronic weighing apparatus, such processing of the fraction in the least significant digit of the digital output has been effected solely depending on the mechanical and electrical inherent errors of the components in the apparatus. In other words, in a conventional electronic weighing apparatus, the stepwise analog input versus digital output characteristic curve is positioned with respect to the ideal straight line a in a diversified manner within the diversion range between the dotted and solid lines b' and "b" in the FIG. 2 analog input versus digital output characteristic, so that such diversion is determined by the electrical and mechanical inherent factors of the respective apparatus. In converting an analog input into a digital signal, it has been common to try to minimize the so called differential non-linearity error. To that end, it is necessary that the respective step or stage portions in the stepwise characteristic curve are crossed by the ideal straight line "a" substantially at the center of the respective step or stage portions. Since such a requirement has not been satisfied by the conventional electronic weighing apparatus and the so called analog input versus digital output characteristic has been diversified with respect to the ideal straight line "a", as discussed with reference to FIG. 2, it could happen that even an extremely minor change of the weight caused, for example, by a draft, slight shock or the like could cause the display to indicate the minimum digital value of unity and thus cause the viewer to a notice flickering in the display.

As described above, it is extremely difficult to achieve a uniform analog input versus digital output characteristic by means of analog-to-digital converters, and thus in an electronic weighing apparatus. Therefore, there is a limit to the accuracy of prior art electronic weighing apparatus. Nevertheless, legislation, for example, could provide for a strict requirement of accuracy to be satisfied by an electronic weighing apparatus used for general commercial transactions. Since the conventional electronic weighing apparatus has not been designed to meet such a requirement, a diversified analog input versus digital output characteristic of the apparatus could make the customer to feel distrustful of such electronic weighing apparatus used in general commercial transactions.

Apart from the foregoing discussion, in general, an analog-to-digital converter inherently comprises a non-linearity error. Hence, it is desired that such a nonlinearity error should be minimized, if possible at all.

The above described various problems could be solved by implementing an improved electronic weighing apparatus that is capable of achieving an ideal analog input versus digital output transfer function characteristic curve as shown in FIG. 1. Such a requirement could be achieved by providing a direct current bias to a preamplifier for amplifying an analog output from a load cell in a conventional electronic weighing apparatus, thereby to adjust the level of the analog signal, as desired. However, it can be readily appreciated that such adjustment would be extremely tiresome and time consuming and nevertheless the characteristic, as thus adjusted, would still be subject to external disturbances such as variation of the ambient temperature or the like.

SUMMARY OF THE INVENTION

The electronic weighing apparatus of the present invention comprises means responsive to the weight of an article being weighed for providing an analog electrical signal representing the weight of said article, means responsive to said analog electrical signal for converting said analog electrical signal into a digital electrical signal representing the weight of said article, means coupled to said converting means for adding a first predetermined digital electrical signal associated with a first predetermined digital value to said weight digital electrical signal for providing a sum digital electrical signal of said weight associated digital electrical signal and said first predetermined digital value electrical signal, means coupled to said adding means for dividing said sum digital electrical signal by a second predetermined digital electrical signal associated with a second predetermined digital value for providing a quotient digital electrical signal, and means responsive to said dividing means for displaying resolution of the quotient digital electrical signal. The said converting means is enhanced to a value as high as the value commensurate to said second predetermined digital value. Preferably the first predetermined digital value is selected to be substantially one half of said second predetermined digital value.

In operation, the weight representing digital electrical signal of enhanced resolution obtainable from the converting means, is shifted by the first predetermined digital value through the addition of the first predetermined digital value to the weight representing digital signal of enhanced resolution which is then divided by said second predetermined digital value, whereby an ultimate weight associated digital signal of desired resolution having a predetermined relation relative to the original weight associated analog signal, is obtained. Since the first predetermined digital value is selected to be substantially one half of the second predetermined digital value, a differential nonlinearity error occuring in converting the said original analog electrical signal into the ultimate digital electrical signal is minimized in terms of an analog input versus digital output transfer function characteristic.

Therefore, it is a principal object of the present invention to provide an improved electronic weighing apparatus comprising means for providing a weight representing analog signal, an analog-to-digital converter and a digital display, wherein a differential non-linearity error occuring in converting the weight representing analog signal into a digital signal is made minimal.

Another object of the present invention is to provide an improved electronic weighing apparatus comprising means for providing a weight associated analog signal, an analog-to-digital converter and a digital display, wherein the value of zero of the analog signal is positioned substantially in the center of the range of zero of the digital signal in terms of the analog input versus digital output transfer function characteristic.

A further object of the present invention is to provide an improved electronic weighing apparatus comprising means for providing a weight representing analog signal, an analog-to-digital converter and a digital display, wherein the value zero of the analog signal is positioned substantially in the center of the range of zero of the digital signal in terms of the analog input versus digital output transfer function characteristic, whereby the apparatus makes sure that a small change in the analog input signal in the vicinity of the value zero does not cause a change in the digital output of zero and accordingly does not cause any undesired flickering phenomenon in the digital display.

A still further object of the present invention is to provide an improved electronic weighing apparatus comprising means for providing a weight representing analog signal, an analog-to-digital converter and a digital display, wherein the analog input versus digital output transfer function characteristic is made uniform irrespective of different characteristics of the weighing mechanism, the analog-to-digital converter and the like.

It is another object of the present invention to provide an improved electronic weighing apparatus comprising means for providing a weight representing analog signal, an analog-to-digital converter and a digital display, wherein the accuracy of the weighing apparatus is enhanced, such enhanced accuracy being possibly required by a statute, regulation, rule or the like. Since the flickering phenomenon or a repetitive change of the digital display between the values zero and one caused by a minor change of the analog signal in the vicinity of the value zero can be eliminated, the accuracy of the weight measurement is enhanced and the analog input versus digital output characteristic is made uniform from apparatus to apparatus. Thus, the customers feel trustful of the weighing apparatus and hence the commercial transactions.

The fact that the weight representing digital signal of enhanced resolution is divided by the second predetermined digital value reduces a non-linearity error occurring in the analog-to-digital converter per se.

It might be possible to position, as desired, the analog signal line with respect to the digital output curve in terms of the analog input versus digital output characteristic, by simply adjusting the bias of the preamplifier. Nevertheless, such adjustment of the bias of the preamplifier is time consuming and is subject to the ambient temperature because of the temperature characteristic of the components in the preamplifier. It will be appreciated that such adjustment can be achieved automatically with a rather simple circuitry in accorddance with the present invention.

These objects and other objects, features, advantages and aspects of the present invention will become more apparent from the following detailed description of the present invention when taken in conjunction with the accompanying drawings.

DESCRIPTION OF THE PREFERRED EMBODIMENTS

Figures 1, 2, 3, 4:
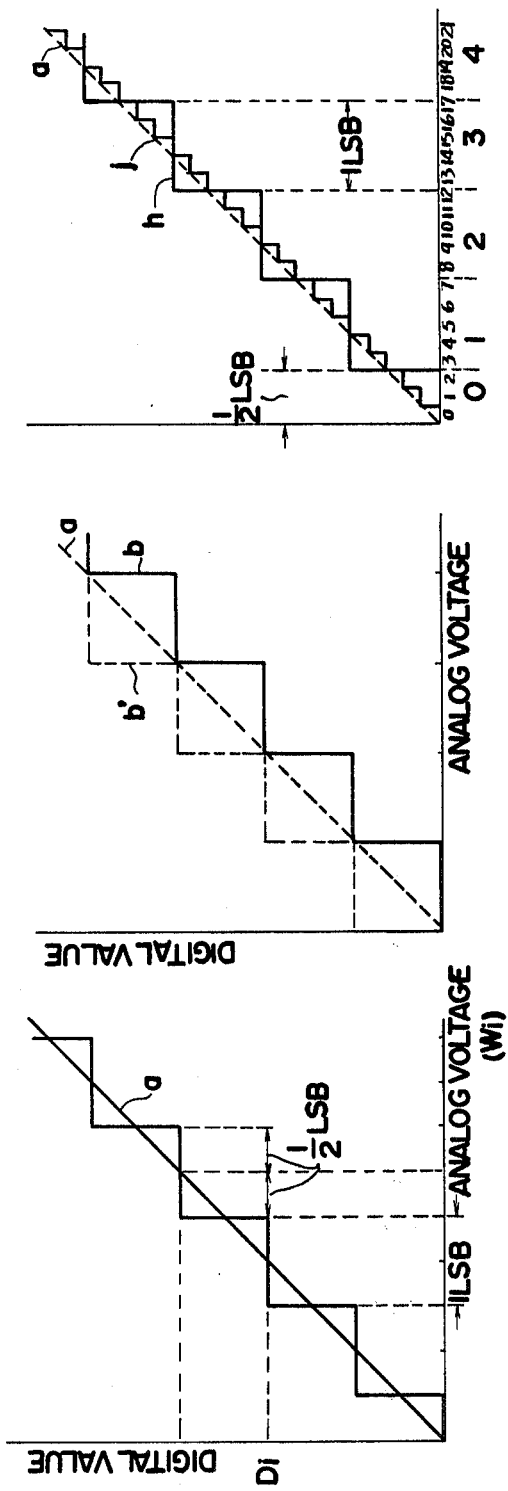
FIG. 1 is a graph showing an ideal analog input versus digital output transfer function characteristic of an electronic weighing apparatus.
FIG. 2 is a graph showing possible diversions of the stepwise analog input versus digital output characteristic curve with respect to the ideal straight line of an electronic weighing apparatus.
FIG. 3 shows a block diagram of an electronic weighing apparatus of an emboidment in accordance with the present invention.
FIG. 4 is a graph showing an analog input versus digital output characteristic in accordance with the emboidment of the present invention of FIG. 3.

FIG. 3 shows a block diagram of an electronic weighing apparatus of an embodiment in accordance with the present invention. Basically, the electronic weighing apparatus shown comprises a load detector 1 such as a load cell, a preamprifier 2, an analog-to-digital converter 3, and a display for displaying the output from a converter 3 in a digital manner. In accordance with the present invention, the output from the converter 3 is not applied directly to the display 5, but instead it is applied to a least significant digit processing circuit 4 for particularly processing the fraction value of the least significant digit of the digital output, for example by discarding the fraction value less than 0.5 in the least significant digit of the digital output and by carrying over the fraction value exceeding 0.5 in the least significant digit of the digital output, by way of an ideal example. The least significant digit processing circuit 4 comprises a digital adder 41 for adding to the output value Di from the analog-to-digital converter 3 a first predetermined constant P1 as a divisor. To that end, the least signifi- predetermined constant P1 to be described below by the number of two and by discarding the fraction value of less significant digit than the decimal point, and a divider 42 for dividing the sum output from the said digital adder 41 as a divident by said second predetermined constant P1 as a divisior. To that end, the least significant digit processing circuit 4 further comprises a divisor setting circuit 43 for setting said second predetermined constant, to be applied to the divider 42, and an addend setting circuit 44 for presetting the addend, i.e. the first predetermined constant, to be applied to the adder 41. The addend constant is preferably selected to be an integer obtained by dividing the second predetermined constant by the number of two and by discarding the fraction value of the less significant digit than the decimal point. For example, assuming the second predetermined constant, i.e. the divisor to be number five, the addend constant, i.e. the first predetermined constant is preferably the number two. In general, the divisor setting circuit 43 and the addend setting circuit 44 are provided independently of each other and the divisor constant and the addend constant to be preset are fixedly set in these circuits when designing the apparatus. However, since the addend constant is preferably determined based upon the divisor constant, as described above, alternatively the addend constant may be adapted to be set by applying the output from the divisor setting circuit 43 to the addend constant setting circuit 44, such that the addend constant may be automatically obtained by the addend constant presetting circuit 44. Preferably, the second predetermined value to be set in the divisor setting circuit 43 may be an odd number such as "3", "5", "7" or the like from the practical stand point. Most preferably, however, from the stand point of hardware configuration of the digital divider, the second predetermined divisor constant should be selected to be the number five. The reason will be more fully described below.

It should be pointed out that because the digital value obtainable from the analog-to-digital converter 3 is divided in the least significant digit processing circuit 4 and the digital output, of the least significant digit thus processed, is displayed in the digital manner, the resolution of the analog-to-digital converter 3 must be enhanced in advance by multiplication with the divisor value as compared with the resolution of such a converter of a conventional electronic weighing apparatus which does not have the inventive least significant digit processing circuit 4. More specifically, assuming that the divisor is the number five and digital display is made with the integers of 0, 1, 2, 3, ..., 100 with respect to the weight of 0 to 100Kg, the analog-to-digital converter 3 of the inventive electronic weighing apparatus must be adapted to provide a digital variation of 0 to 500 with respect to a variation of the analog input 0 to 100, i.e. five digital values with respect to a unity variation of the analog input, which is then reduced to the digital value of one through division by the divider 42, such that one digital value variation is obtained with respect to the original unity analog input variation range.

FIG. 4 shows an analog input versus digital output transfer function characteristic in accordance with the embodiment of the present invention employing the divisor constant five in the divider 42. Referring to FIG. 4, the operation of the FIG. 3 embodiment will now be generally described.

The output voltage Vi proportional to the weight obtainable from the load converter 1 is amplified by a predetermined amplification factor by means of the preamplifier 2. The output from the preamplifier 2 is converted into a digital signal Di by means of the analog-to-digital converter 3. The digital signal Di is applied to the digital adder 41 as a summand. On the other hand, the addend constant signal P2 obtainable from the addend constant setting circuit 44 is applied to the digital adder 41 as an addend constant. As described above, assuming the divisor constant to be "5", the addend constant represented by the addend constant signal P2 is "2". As a result, addition of $Di + P2 = D0$ is carried out by the digital adder 41 and the sum output signal D0 is applied to the divider 42 as a dividend. In the divider 42, division of the dividend D0 by the divisor constant signal P1 preset by the divisor setting circuit 43, i.e. $D0/P1 = Da$, is carried out. The divisor represented by the divisor constant signal P1 was assumed to be "5" in the foregoing example. The quotient output signal Da from the divider 42 is applied to a digital output device 5 such as a digital display as a weight representing digital display signal, with the fraction value of the less significant digit than the decimal point being discarded. From the foregoing description of the operation, it is seen that, with particular reference to FIG. 4, the divisor constant P1 is 5 and accordingly the addend constant P2 is assumed to be 2, the digital numerical value output j obtainable from the analog-to-digital converter 3 is shited from the original point by two steps by means of the adder 41. The digital value output j, thus shifted, is then divided by the digital value 5 by means of the divider 42 and the resultant weight representing digital value output h is obtained.

In other words, assuming that the variation amount of the analog input required for variation of a unity digital value is a unity LSB, as shown in FIG. 2, the zero point is first shifted by a half of one LSB and then a weight associated digital value is generated by each one LSB variation of a weight representing analog input, whereby a half of a unity digital value is reached when a transition of the digital output results. Therefore, an ideal analog input versus digital output transfer function characteristic can be achieved wherein a differential non-linearity error has been minimized.

Figure 5:
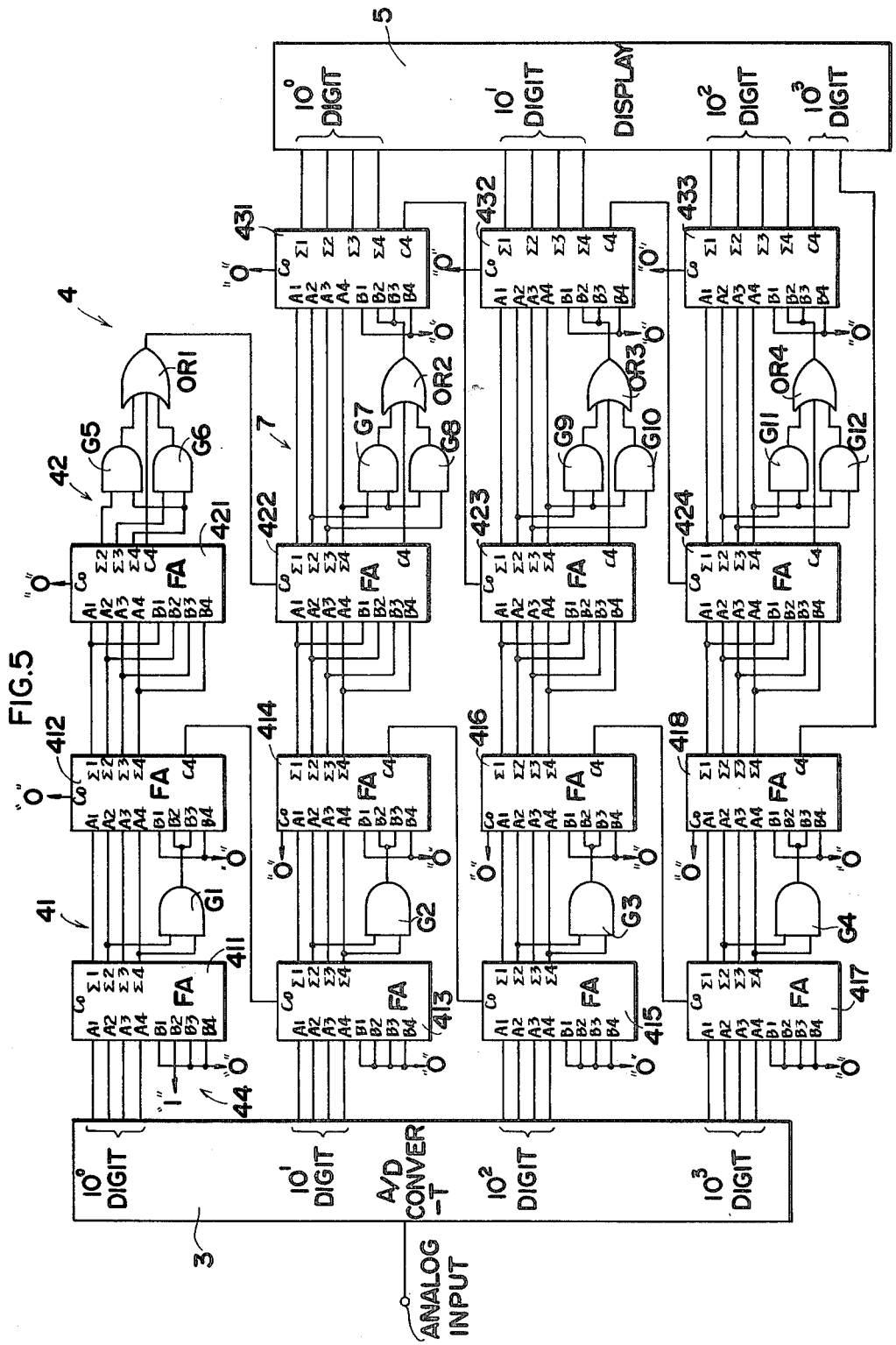
FIG. 5 shows a block diagram showing in more detail one embodiment of the least significant digit processing circuit shown in FIG. 3.

FIG. 5 shows in a block diagram in more detail one embodiment of the lest significant digit processing circuit 4 shown in FIG. 3. It is pointed out that the FIG. 5 embodiment has been designed to employ the divisor constant "5" and the addend constant "2". The analog-to-digital converter 3 comprises decimal four-digit outputs, each parallel digit comprising a bit parallel BCD code. The digital adder 41 comprises in each digit position of the analog-to-digital converter 3 a pair of four-bit binary full adders 411, 412; 413, 414; 415, 416; and 417, 418, which are of substantially the same structure, only pair of the first digit position will be described in detail in the following, for simplicity of description. The four-bit parallel outputs in the first digit are applied to summand inputs A1, A2, A3 and A4 of the full adder 411. The addend inputs B1, B2, B3 and B4 of the full adder 411 are supplied with the BCD code outputs of the decimal number "2" obtainable from the addend constant setting circuit 44. More specifically, only the addend input terminal B2 is supplied with the logic one, while the remaining input terminals B1, B3 and B4 are applied with the logic zero. The addend input terminals of the remaining digits are all supplied with the logic zero, which means that those input terminals of the remaining digits are supplied with the decimal number "0". This means that only the least significant digit of the decimal is supplied with the decimal number "2" so that the same is added to the digital value from the converter 3, whereby digital addition is performed. The bit parallel outputs from the first stage full adder 411 are applied to the summand inputs A1 through A4 of the second stage full adder 412 in a parallel fashion. The second stage full adder 412 is originally provided to withdraw a carry output from the first stage full adder 411. To that end, the second and fouth bit position outputs out of the bit parallel outputs from the first stage full adder 411 are AND processed by means of an AND gate G1 and the logical product output is applied to the second and third bit input terminals B2 and B3 of the addend input terminals of the second stage full adder 412. The first and fourth bit positions B1 and B4 out of the addend input terminals have been preset to be supplied with the logic zero. The logical product of the second and foruth bit outputs is obtained for the purpose of detecting a carry of the first stage full adder 411. The reason is that in the embodiment shown only the addend constant of "2" is applied to the first stage full adder 411 and therefore a carry is obtained only when the sum output is the decimal number "10" or "11", in which event the second and fourth bit outputs become the logic one at the same time and otherwise a different logical situation is caused. The logical product output obtainable from the AND gate G1 is applied to the second and third bit positions B2 and B3 of the addend input terminals of the scond stage full adder 412. This means that when a carry is obtained from the first stage full adder 411 the decimal number "6" is applied to the bit parallel output of the first stage full adder 411, whereas when a carry is not obtained from the first stage full adder 411 the decimal number "0" is applied to the bit parallel output of the first stage full adder 411, i.e. the output from the first stage full adder 411 is adapted to pass through the second stage full adder 412.

The decimal number "6" is added, only when the output from the first stage full adder 411 is the decimal number "10" or "11". Therefore, the output from the second stage full adder becomes the decimal number "16" or "17", which means, in terms of BCD, a carry and a decimal number "0" or "1". Thus, it will be appreciated that a carry processing of the resultant sum obtainable from the first stage full adder is effected by the use of the second stage full adder 412 and the AND gate G1. The carry output from the second stage full adder 412 is, of course, applied to a carry input of the first stage full adder 413 of the next adjacent digit position.

The resultant sum output from the digital adder 41 is then divided by the divisor constant of five by means of the divider 42. It is pointed out that, for the purpose of implementing a divisional operation scheme, the FIG. 5 embodiment has been structured such that the dividend, i.e. the resultant sum by the adder 41, is doubled, or multiplied by the decimal number 2 and the product is then divided by the decimal number 10, namely, the doubled product is processed such that the least significant digit thereof is discarded. More specifically, for the purpose of doubling the dividend, the four-bit parallel outputs of the second stage full adder 412 in the adder 41 are applied to the summand input terminals of the full adder 421 in the third stage in a parallel fashion and also applied to the addend input terminals in a parallel fashion. For the purpose of detecting a carry in the third full adder 421, as done in case of the adder 41, AN gates G5 and G6 and an OR gate OR1 are provided. A carry of the thid stage full adder 421 is not limited to the decimal numbers "10" and "11" as in case of the first stage full adder 411, and instead may be considered to have five different decimal numbers of "10 (5 × 2)", "12 (6 × 2)", "14 (7 × 2)", "16 (8 × 2)" and "18 (9 × 2)". Based on a similar idea in case of the first stage full adder 411, the second and fourth bit outputs out of the four-bit parallel outputs are applied to the AND gate G5 and the third and fouth bit output of the four-bit parallel outputs are applied to the AND gate G6 and the outputs from these AND gates G5 and G6 and the carry output C4 are applied to the OR gate OR1. The output from the OR gate OR1 is applied as a carry output to a carry input of the third stage full adder 422 of the next adjacent digit position. The fouth stage full adder in the least significant digit position has been dispensed with, for the purpose of division of the doubled product by the decimal number 10, i.e. for the purpose of discarding the least significant digit of the said doubled product. The remaining digit positions each have been provided with the fourth stage full adders 431, 432 and 433, based on the same idea as employd in the second stage adders with respect to the first stage full adders. Therefore, it is not believed necessary to describe the same in more detail.

The four-bit parallel outputs of the respective fourth stage full adders 431, 432 and 433 are withdrawn such that those in each digit position represent one more significant digit position, and are applied to the digital display 5 in a digit parallel and bit parallel fashion. However, the possible value in the most significant digit has been limited to the decimal number "0", "1", or "2". The reason is that, assuming the maximum digital value from the converter 3 to be the decimal number "9999", the possible maximum value to be withdrawn to the output circuit 5 ultimately is the decimal number "(9999 + 2) ÷ 5 ≈ 2000". To that end, the most significant digit output has been structured such that the decimal number "1" is withdrawn from the carry output of the fourth stage full adder 433 and the decimal number "2" is withdrawn from the carry output of the second stage full adder, no output being obtained from the carry outputs of the second and fourth stage full adders when the decimal number "0" is obtained. From the foregoing detailed description with reference to FIG. 5, it will be appreciated that the calculation discussed with reference to FIG. 3 can be achieved.

Figure 6:
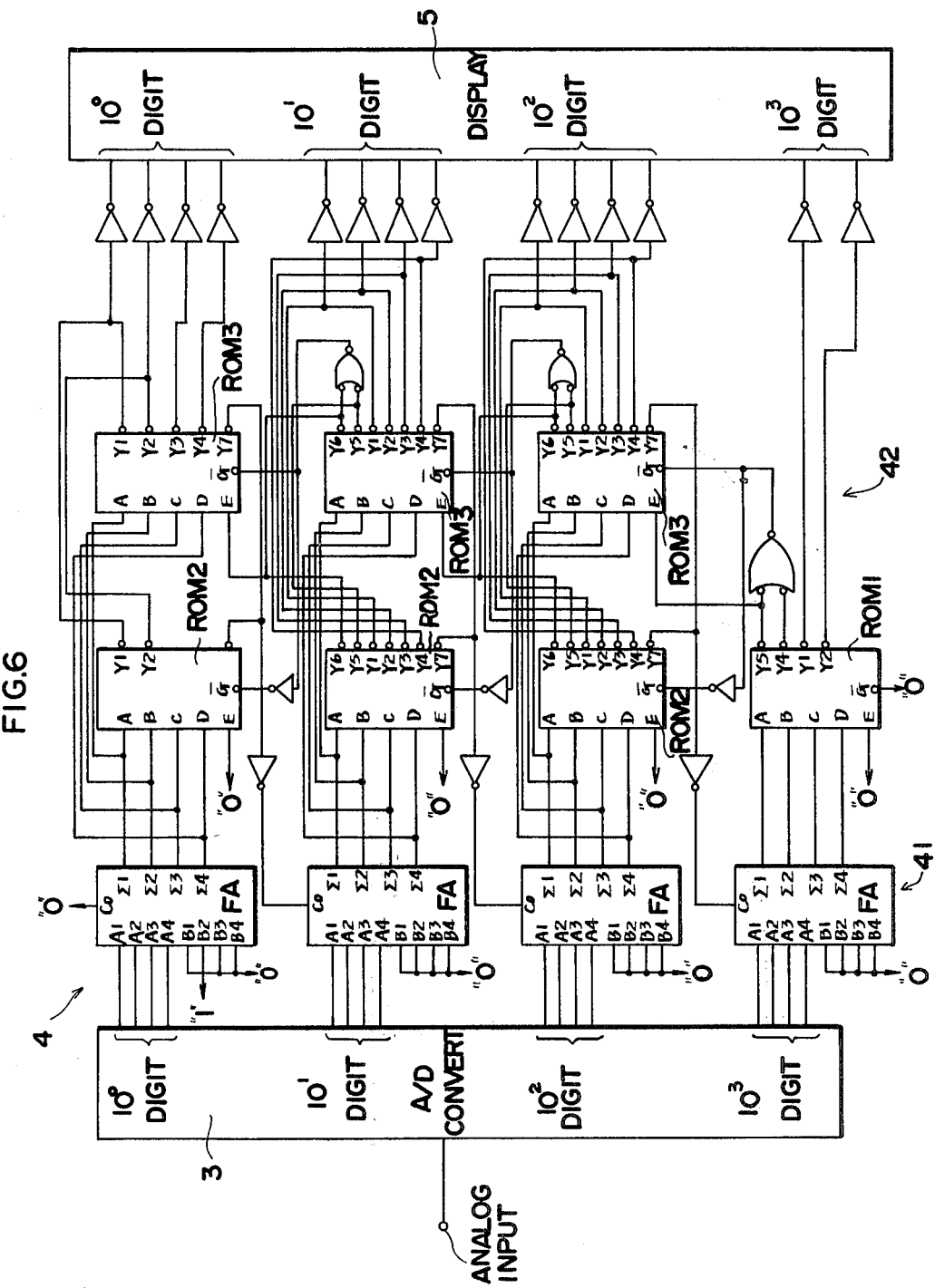
FIG. 6 shows a detailed block diagram of another embodiment of the least significant digit processing circuit shown in FIG. 3.

FIG. 6 shows a detailed block diagram of another embodiment of the least significant digit processing circuit 4 shown in FIG. 3. The embodiment shown is structured to use the decimal number "3" as a divisor constant and accordingly to use the decimal number "1" as an addend constant. The digital adder 41 comprises only a first stage full adder for each digit. Since the division by the decimal number "3" cannot be implemented so simply as done in the division by the decimal number "5" described with reference to FIG. 5, the divider 42 is implemented by a read only memory structured to be responsive to the four-bit parallel outputs from the respective full adders of the digital adder 41 to provide a decoded bit parallel output loaded in advance in the memory. More specifically, the divider 42 is structured such that the most significant digit comprises a single read only memory ROM1 while the less significant digit positions each comprise a pair of read only memories ROM2 and ROM3, these read only memories ROM1, ROM2 and ROM3 being programmed by different data, to be described below. The divider 42 is thus structured, because the division is usually carried out for the most significant digit and therefore the input value of the read only memory ROM1 in the most significant digit is divided by the decimal number "3" and the quotient thereof and the remainder are used to select either read only memory ROM2 or ROM3 in the next less significant digit and so on, so that the structure of the read only memories may be simplified. Selection of the read only memory ROM2 or ROM3 is determined by the input to the terminals G of the respective memories. The outputs from these read only memories ROM1, ROM2 and ROM3 are properly logic processed, as shown in FIG. 6, and applied to the digital display 5. The truth table of the inputs and outputs pf these read only memories ROM1, ROM2 and ROM3 is shown in Table 1.

Figure 7:
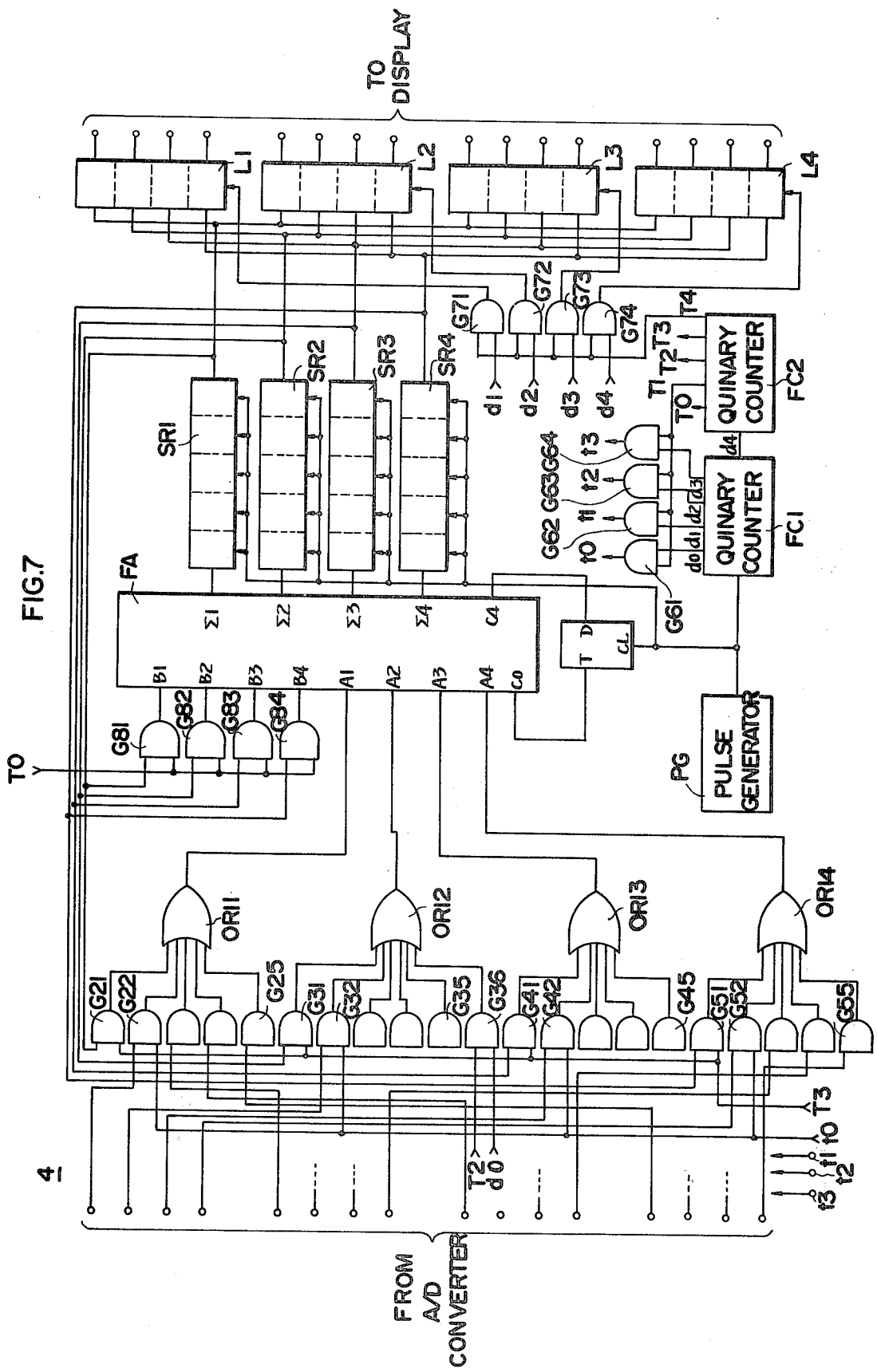
FIG. 7 is a detailed block diagram of a further embodiment of the least significant digit processing circuit in FIG. 3.

FIG. 7 is a detailed block diagram of a further embodiment of the least significant digit processing circuit 4 in FIG. 3. The FIG. 7 embodiment is also structured to use the decimal number "5" as a divisor constant and the decimal number "2" as an addend constant. Thus, the FIG. 7 embodiment is a modification of the FIG. 5 embodiment. However, embodiment of FIG. 7 differs from the embodiment of FIG. 5 and is sturctured to process the bit parallel output of the analog-to-digital converter 3 in a bit parallel and digit series fashion. To that end, the least significant digit processing circuit 4

TABLE I

| | | | | | ROM - 1 | | | | | | | | ROM - 2 | | | | | | | | ROM - 3 | | | | | | | |
|---|---|---|---|---|---|---|---|---|---|---|---|---|---|---|---|---|---|---|---|---|---|---|---|---|---|---|---|---|
| A | B | C | D | E | Y1 | Y2 | Y3 | Y4 | Y5 | Y6 | Y7 | Y8 | Y1 | Y2 | Y3 | Y4 | Y5 | Y6 | Y7 | Y8 | Y1 | Y2 | Y3 | Y4 | Y5 | Y6 | Y7 | Y8 |
| 0 | 0 | 0 | 0 | 0 | 1 | 1 | 0 | 1 | 1 | 0 | 0 | 0 | 1 | 1 | 0 | 0 | 1 | 1 | 1 | 0 | 1 | 0 | 0 | 1 | 1 | 0 | 1 | 0 |
| 1 | 0 | 0 | 0 | 0 | 1 | 1 | 1 | 0 | 0 | 1 | 0 | 0 | 0 | 1 | 1 | 0 | 0 | 0 | 1 | 1 | 0 | 0 | 0 | 0 | 1 | 1 | 1 | 0 |

TABLE I-continued

| A | B | C | D | E | Y1 | Y2 | Y3 | Y4 | Y5 | Y6 | Y7 | Y8 | Y1 | Y2 | Y3 | Y4 | Y5 | Y6 | Y7 | Y8 | Y1 | Y2 | Y3 | Y4 | Y5 | Y6 | Y7 | Y8 |
|---|---|---|---|---|---|---|---|---|---|---|---|---|---|---|---|---|---|---|---|---|---|---|---|---|---|---|---|---|
| 0 | 1 | 0 | 0 | 0 | 1 | 1 | 0 | 1 | 0 | 0 | 0 | 0 | 1 | 1 | 0 | 0 | 1 | 0 | 1 | 0 | 0 | 0 | 1 | 0 | 1 | 1 | 0 |
| 1 | 1 | 0 | 0 | 0 | 0 | 1 | 0 | 1 | 1 | 0 | 0 | 0 | 0 | 1 | 0 | 0 | 1 | 1 | 1 | 0 | 0 | 0 | 1 | 1 | 0 | 1 | 0 |
| 0 | 0 | 1 | 0 | 0 | 0 | 1 | 0 | 0 | 1 | 0 | 0 | 0 | 0 | 1 | 0 | 0 | 0 | 1 | 1 | 0 | 1 | 1 | 0 | 1 | 1 | 1 | 0 |
| 1 | 0 | 1 | 0 | 0 | 0 | 1 | 0 | 1 | 0 | 0 | 0 | 0 | 0 | 1 | 0 | 0 | 1 | 0 | 1 | 0 | 1 | 1 | 1 | 0 | 0 | 1 | 0 |
| 0 | 1 | 1 | 0 | 0 | 1 | 0 | 0 | 1 | 1 | 0 | 0 | 0 | 1 | 0 | 0 | 0 | 1 | 1 | 1 | 0 | 1 | 1 | 1 | 0 | 1 | 1 | 0 |
| 1 | 1 | 1 | 0 | 0 | 1 | 0 | 0 | 0 | 1 | 0 | 0 | 0 | 1 | 0 | 0 | 0 | 1 | 1 | 0 | 0 | 1 | 1 | 0 | 1 | 1 | 1 | 0 |
| 0 | 0 | 0 | 1 | 0 | 1 | 0 | 0 | 1 | 0 | 0 | 0 | 0 | 1 | 0 | 0 | 0 | 1 | 0 | 1 | 0 | 0 | 1 | 1 | 0 | 0 | 1 | 0 |
| 1 | 0 | 0 | 1 | 0 | 0 | 0 | 0 | 1 | 1 | 0 | 0 | 0 | 0 | 0 | 0 | 0 | 1 | 1 | 1 | 0 | 0 | 1 | 1 | 0 | 1 | 0 | 0 |
| 0 | 1 | 0 | 1 | 0 | 0 | 0 | 0 | 0 | 1 | 0 | 0 | 0 | 1 | 1 | 0 | 0 | 1 | 0 | 0 | 1 | 1 | 0 | 0 | 0 | 0 | 0 | 0 |
| 1 | 1 | 0 | 1 | 0 | 1 | 1 | 0 | 1 | 1 | 0 | 0 | 0 | 1 | 1 | 0 | 0 | 1 | 0 | 0 | 0 | 0 | 0 | 0 | 0 | 0 | 0 | 0 |
| 0 | 0 | 1 | 1 | 0 | 1 | 1 | 0 | 1 | 1 | 0 | 0 | 0 | 1 | 1 | 0 | 0 | 1 | 1 | 1 | 0 | 0 | 0 | 0 | 0 | 0 | 0 | 0 |
| 1 | 0 | 1 | 1 | 0 | 1 | 1 | 0 | 1 | 1 | 0 | 0 | 0 | 1 | 1 | 0 | 0 | 1 | 1 | 1 | 0 | 0 | 0 | 0 | 0 | 0 | 0 | 0 |
| 0 | 1 | 1 | 1 | 0 | 1 | 1 | 0 | 1 | 1 | 0 | 0 | 0 | 1 | 1 | 0 | 0 | 1 | 1 | 1 | 0 | 0 | 0 | 0 | 0 | 0 | 0 | 0 |
| 1 | 1 | 1 | 1 | 0 | 1 | 1 | 0 | 1 | 1 | 0 | 0 | 0 | 1 | 1 | 0 | 0 | 1 | 1 | 1 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 | 0 | 1 | 1 | 0 | 1 | 1 | 1 | 0 |
| 1 | 0 | 0 | 0 | 1 | 0 | 0 | 0 | 0 | 0 | 0 | 0 | 0 | 0 | 0 | 0 | 0 | 0 | 0 | 0 | 0 | 1 | 1 | 1 | 0 | 1 | 0 | 0 |
| 0 | 1 | 0 | 0 | 1 | 0 | 0 | 0 | 0 | 0 | 0 | 0 | 0 | 0 | 0 | 0 | 0 | 0 | 0 | 0 | 1 | 0 | 1 | 1 | 1 | 1 | 1 | 0 |
| 1 | 1 | 0 | 0 | 1 | 0 | 0 | 0 | 0 | 0 | 0 | 0 | 0 | 0 | 0 | 0 | 0 | 0 | 0 | 1 | 1 | 0 | 1 | 0 | 1 | 1 | 1 | 0 |
| 0 | 0 | 1 | 0 | 1 | 0 | 0 | 0 | 0 | 0 | 0 | 0 | 0 | 0 | 0 | 0 | 0 | 0 | 0 | 1 | 1 | 0 | 1 | 1 | 0 | 1 | 0 | 0 |
| 1 | 0 | 1 | 0 | 1 | 0 | 0 | 0 | 0 | 0 | 0 | 0 | 0 | 0 | 0 | 0 | 0 | 0 | 0 | 0 | 1 | 0 | 1 | 1 | 1 | 1 | 1 | 0 |
| 0 | 1 | 1 | 0 | 1 | 0 | 0 | 0 | 0 | 0 | 0 | 0 | 0 | 0 | 0 | 0 | 0 | 0 | 0 | 0 | 1 | 0 | 1 | 0 | 1 | 1 | 1 | 0 |
| 1 | 1 | 1 | 0 | 1 | 0 | 0 | 0 | 0 | 0 | 0 | 0 | 0 | 0 | 0 | 0 | 0 | 0 | 0 | 0 | 1 | 0 | 1 | 1 | 0 | 1 | 0 | 0 |
| 0 | 0 | 0 | 1 | 1 | 0 | 0 | 0 | 0 | 0 | 0 | 0 | 0 | 0 | 0 | 0 | 0 | 0 | 0 | 1 | 0 | 0 | 1 | 1 | 1 | 1 | 1 | 0 |
| 1 | 0 | 0 | 1 | 1 | 0 | 0 | 0 | 0 | 0 | 0 | 0 | 0 | 0 | 0 | 0 | 0 | 0 | 0 | 1 | 0 | 0 | 1 | 0 | 1 | 1 | 1 | 0 |
| 0 | 1 | 0 | 1 | 1 | 0 | 0 | 0 | 0 | 0 | 0 | 0 | 0 | 0 | 0 | 0 | 0 | 0 | 0 | 0 | 0 | 1 | 1 | 0 | 1 | 0 | 0 | 0 |
| 1 | 1 | 0 | 1 | 1 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 0 |
| 0 | 0 | 1 | 1 | 1 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 0 |
| 1 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | of the embodiment shown comprises a parallel/series converter implemented by AND gates G21, G22, . . . G25, . . . G55 and OR gates OR11 to OR14, a full adder FA, four shift registers SR1 through SR4 connected to four-bit parallel outputs, respectively, of the full adder FA, and a latch circuits L1 through L4 adapted to latch the outputs from the shift registers SR1 through SR4, respectively. The least significant digit processing circuit 4 further comprises a pulse generator PG for generating various timing signals for use in the circuit 4, a first quinary counter FC1 for counting the pulses from the pulse generator PG, and a second quinary counter FC2 for counting every fifth count output of the first quinary counter FC1. The first to fourth count outputs of the quinary counter FC1 are applied to one group of inputs to the corresponding AND gates G61 to G64, respectively. The other inputs to the AND gates G61 to G64 are commonly supplied with the T1 output of the second quinary counter FC2. The output from these AND gates G61 to G64 are utilized as timing signals t0 to t3, respectively.

Now, the operation of the embodiment shown will be described in accordance with the order of the timing signals T0 to T4 from the second quinary counter FC2.

(1) T0 timing

In this timing, the shift registers SR1 to SR4 are cleared. More specifically, since the timing signal T0 is applied, after inversion, to one group of inputs to the AND gates G81 to G84, the recirculating contents in these shift registers SR1 to SR4 are interrupted by the AND gates G81 to G84, respectively, which means that the shift register SR1 to SR4 are cleared.

(2) T1 timing

During this T1 timing period, the timing signals t0 to t3 are obtained. Accordingly, at the timing t0 the AND gates G22, G32, G42 and G52 are first enabled, whereby the bit parallel outputs in the least significant digit of the analog-to-digital converter 3 are allowed to pass therethrough and are applied to summand input terminals A1 to A4 of the full adder FA to OR gates OR11 through OR14, respectively. The data applied to the full adder FA is loaded in the corresponding shift registers SR1 to SR4. Thus, in the timing t1, t2 and T3, the output from the converter 3 is loaded in the shift registers SR1 to SR4 through the full adder FA in the digit sequence. It is pointed out that for simplicity of illustration the connection of the output from the converter and the parallel/series converter comprising a group of gates is shown in detail only for the least significant digit output and is partially omitted for the remaining digit outputs.

(3) T2 timing

This timing signal T2 is applied to an AND gate G35. Accordingly, in this timing the AND gate G35 is enabled and the timing signal d0 (the first count output of the quinary counter FC1) is applied through an OR gate OR21 to the second bit position A2 of the summand input of the full adder FA. Since no signal is obtained from the remaining OR gates OR11, OR13 and OR14, it follows that in this timing T2 the decimal number "2" is applied to the full adder FA. This means that the decimal number "2" is added to the output from the converter 3 already stored in the shift registers SR1 to SR4 at the timing T1.

(4) T3 timing

Since this timing signal T3 enables the AND gates G21, G32, G41 and G51, the contents in the shift registers SR1 to SR4, the digital value obtained by addition of the decimal number "2" to the digital output from the converter 3, as already stored in the timing T1 and T2, are applied to the summand inputs A1 to A4 of the full adder FA through the corresponding AND gates G21, G31, G41 and G51 and the OR gates OR11 to OR14, respectively. On the other hand, the same contents are applied to the addend inputs B1 to B4 of the full adder FA simultaneously through the AND gates G81 to G84, respectively. As a result, it follows that in this timing T3 the digital value obtained by addition of the decimal number "2" to the decimal value obtained from the converter 3 is doubled or is multiplied by the decimal number "2". This function is substantially the same as the function of the full adder 421 in FIG. 5.

(5) T4 timing

This timing signal T4 is utilized to achieve a timing for latching the contents in the shift registers SR1 to SR4 in the latch circuits L1 to L4, respectively. More specifically, the AND gates G71 to G74 are enabled as a function to the timing signal T4 and the corresponding latch circuits L1 to L4 are enabled as a function of the second to a fifth outputs d1 to d4 generated in the quinary counter FC1 during that time period. At that time, the first output d0 of the quinary counter FC1 is discarded, which means that the least significant digit is discarded, with the result that division by the decimal number "10" is effected in substantially the same manner as described with reference to FIG. 5. It will be appreciated that in the FIG. 7 embodiment the operation is achieved by the use of the timing signals.

Although in the foregoing a variety of embodiments of the least significant digit processing circuit 4 were described, different modifications such as employing a microprocessor can be implemented. In essence, the resolution of the analog-to-digital converter in the inventive electronic weighing apparatus is enhanced by n times and the output from the analog-to-digital converter is made to undergo addition of substantially a half of the value n, the sum of which is then divided by the said value n.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An electronic weighing apparatus for converting an analog electrical signal representing the weight of an article being weighed, to a digital electrical signal of a given resolution, comprising: analog signal means responsive to the weight of an article being weighed for providing said analog electrical signal representing the weight of said article, analog-to-digital converter means responsive to said analog electrical signal for converting said analog electrical signal into a first digital electrical signal (Di) representing the weight of said article at the output of said analog-to-digital converter whereby said first digital electrical signal (Di) is subject to the differential non-linearity inherent in said analog-to-digital converter means, adder means coupled to said analog-to-digital converter means for adding a digital electrical addend signal value (P2) to said first weight representing digital electrical signal (Di) for providing a sum digital electrical signal (Do), whereby said first weight representing digital electrical signal is shifted by said digital electrical addend signal value (P2) toward an improved analog - to - digital transfer function, divider means coupled to said adder means for dividing said sum digital electrical signal (Do) by a digital electrical divisor signal value (P1) for providing a second weight representing digital electrical output signal (Da) at the output of said divider means, said electrical addend signal value (P2) having a fixed relationship to said electrical divisor signal value (P1) such that said second weight representing digital electrical output signal (Da) has an improved resolution relative to said first weight representing digital electrical signal (Di), and whereby said second weight representing digital electrical output signal (Da) has a determined relation to said weight associated analog signal, and means responsive to said divider means for displaying said second digital electrical signal, whereby any differential non-linearity error occurring in said analog-to-digital converting is minimized.

2. The apparatus of claim 1, wherein the numerical value representing said digital addend value is substantially one half of said digital divisor signal value.

3. The apparatus of claim 2, wherein the resolution of said analog-to-digital converter means is enhanced by said digital divisor signal value (P1).

4. The apparatus of claim 3, wherein said adder means comprise addend setting means for providing said digital electrical addend signal value, and adder means proper responsive to said analog-to-digital converting means and to said addend setting means for adding said addend signal (P2) to said first weight representing digital electrical signal (Di).

5. The apparatus of claim 4, wherein said divider means comprise divisor setting means for providing said digital electrical divisor signal value and divider means proper responsive to said adder means proper and to said divisor setting means for dividing said sum digital electrical signal (Do) by said digital electrical divisor signal value.

6. The apparatus of claim 5, wherein the numeral value represented by said digital electrical divisor signal value is selected to be an integer.

7. The apparatus of claim 1, wherein the resolution of said analog-to-digital converter means is enhanced by said digital divisor signal value.

8. The apparatus of claim 1, wherein said adder means comprise addend setting means for providing said digital electrical addend signal value, and adder means proper responsive to said analog-to-digital converting means and to said addend setting means for adding said addend signal (P2) to said first weight representing digital electrical signal (Di).

9. The apparatus of claim 1, wherein said divider means comprise divisor setting means for providing said digital electrical divisor signal value, and divider means proper responsive to said adder means proper and to said divisor setting means for dividing said sum digital electrical signal (Do) by said digital electrical divisor signal value.

10. The apparatus of claim 1, wherein the numeral value represented by said digital electrical divisor signal value is selected to be an integer.

11. The apparatus of claim 10, wherein said integer is an odd number.

12. The apparatus of claim 11, wherein said digital electrical addend signal value is selected to be one half of said odd number, with the fraction being discarded.

13. The apparatus of claim 12, wherein said digital electrical addend signal value is selected to be the decimal number two and said digital electrical divisor signal value is selected to be the decimal number five.

14. The apparatus of claim 13, wherein said divider means comprise means coupled to said adder means for multiplying said sum digital electrical signal (Do) by an electrical signal representative of the decimal number two, and means coupled to said multiplying means for withdrawing the output from said multiplying means with the digit positions shifted to a more significant digit position.

15. The apparatus of claim 10, wherein said integer is an even number.

16. The apparatus of claim 15, wherein said digital, electrical addend signal value is selected to be one half of said even number.

17. The apparatus of claim 1, wherein the output from said analog-to-digital converter means comprises a plurality of parallel digit outputs, each parallel digit output comprising a plurality of parallel bits.

18. The apparatus of claim 1, wherein the output from said analog-to-digital converter means comprises a plurality of series digit outputs, each series digit output comprising a plurality of coded parallel bit outputs.

19. The apparatus of claim 1, wherein said divider means comprises memory means responsive to said adder means for providing said second digital electrical output signal (Da) of said sum digital electrical signal (Do) divided by said digital electrical divisor signal value.

20. An electronic weighing apparatus for converting an analog electrical signal (W1) representing the weight of an article being weighed, to a digital electrical signal (Da) of an improved resolution, comprising: analog signal means responsive to the weight of an article being weighed for providing said analog electrical signal (W1) representing the weight of said article, analog-to-digital converter means responsive to said analog electrical signal (W1) for converting said analog electrical signal into a digital electrical signal (Dl) representing the weight of said article means coupled to said analog-to-digital converter means for adding an addend digital value (P2) to said weight representing digital electrical signal (D1) for providing a sum digital electrical signal (Do), whereby said weight representing digital electrical signal (Dl) is shifted by said addend digital value (P2) toward an improved analog-to-digital transfer function, divider means coupled to said adder means for dividing said sum digital electrical signal (Do) by a divisor digital value (P1) for providing an improved weight representing digital electrical signal (Da) having a predetermined relation to said weight associated analog signal (W1) and display means responsive to said divider means for displaying said improved digital electrical signal, whereby any differential non-linearity error occurring in said converting is minimized, wherein said adder means comprise means for providing said addend digital value and adder means proper responsive to said analog-to-digital converter means and to said addend digital value means, and wherein said divider means comprise means for providing said divisor digital value, and divider means proper responsive to said adder means and to said divisor digital value means, and wherein said addend digital value (P2) and said divisor digital value/ P1) have a given relationship to each other such that P2 to P1 corresponds approximately to 1 to 2 whereby said improved resultation is obtained.

* * * * *